United States Patent Office

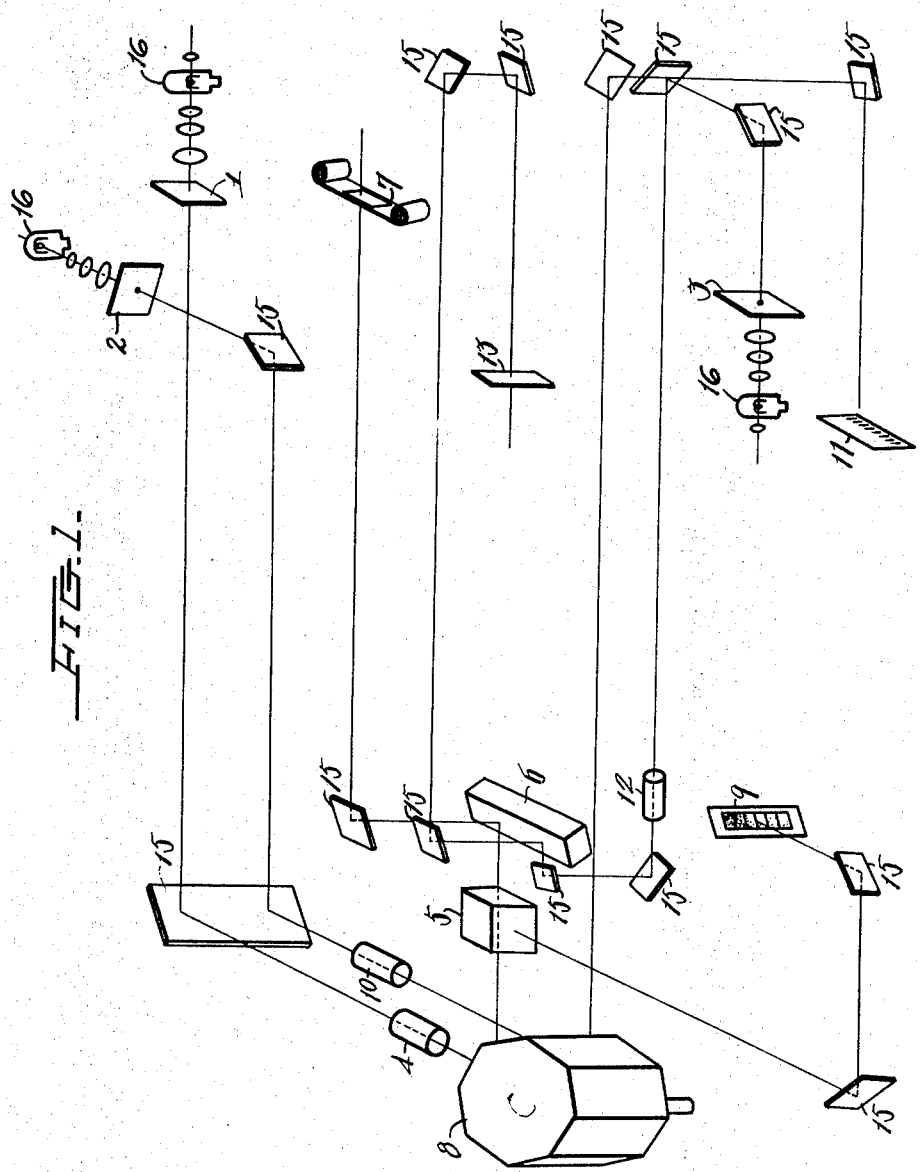

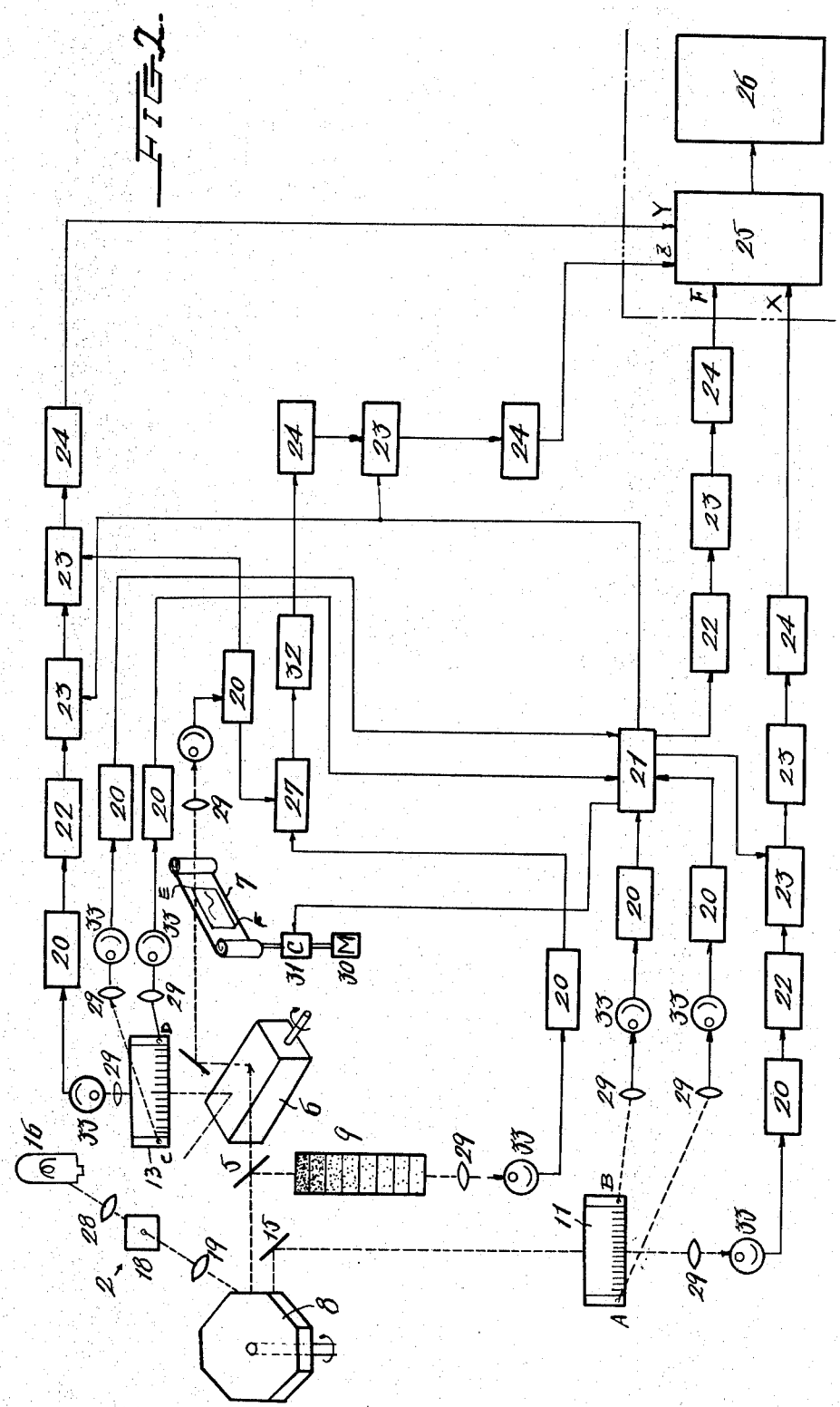

3,546,468
Patented Dec. 8, 1970

3,546,468
FLYING SPOT SCANNER FOR FILM WITH SCALES WHICH INDICATE POSITION OF SPOT
Masaaki Takahashi, 1313 Takada-machi, Kohoku-ku, Yokohama, Japan
Filed May 24, 1967, Ser. No. 640,992
Int. Cl. G06k *11/60*
U.S. Cl. 250—219        2 Claims

ABSTRACT OF THE DISCLOSURE

The present invention utilizes an optical scanner sweeping the film by a flying spot. An electronic device associated with the optical scanner detects the light transmission variance and measures the x, y axes on the swept direction. The resultant output signals, i.e. light transmittance and spot position information, are amplified by an amplifier, then fed to a logic circuit, which records digitally the information contained in the output, onto a magnetic tape. The complete analysis of the photographic film recorded data is thus obtained by using a digital computer which reads the magnetic tape.

---

The present invention relates to an automatic analyzer for photographic film recorded data processing.

There are already known numerous types of analyzers for photographic film recorded data processing. A typical example for such an analyzer consists of a manual tracer positioning an image projected on a screen of the analyzer at a hair-line crossing and a read-out device such as a microscope measuring x, y coordinates obtained at said crossing. However, up to the present time no system has been found which is able to guarantee simultaneously some essential conditions, such as facility of automatic processing, improvement of accuracy and facility of high-speed processing.

The known systems cannot meet the high-speed requirements for the huge data processing produced by the recent improved photographic instrumentation technique and the accuracy requirement for personal error which might be caused by the individual readout operator.

The solution foreseen by the present invention adapts perfectly to all the exigencies and allows the operator a detection of value of density of photographed images on the film, a heretofore unavailable feature for the known art, and thus expands the utility of the photographic instrumentation.

The present invention utilizes an optical scanner sweeping the film by a flying spot. An electronic device associated with the optical scanner detects the light transmission variance and measures the x, y axes on the swept direction. The resultant output signals, i.e. light transmittance and spot position information, are amplified by an amplifier, then fed to a logic circuit, which records digitally the information contained in the output, onto a magnetic tape. The complete analysis of the photographic film recorded data is thus obtained by using a digital computer which reads the magnetic tape.

The accompanying drawings illustrate exemplifying but not limiting details of preferred forms of the invention, and in which:

FIG. 1 is a perspective view of a photographic film recorded data automatic analyzer according to the invention in the aspect of its optical configuration, and FIG. 2 is a block diagram of the electronic circuitry of FIG. 1.

As shown in FIG. 1, each pinhole slit 1, 2 (FIG. 2) and 3 has a light source 16. A light beam passed through slit 1 is projected by an optical system to octahedral rotary mirror 8, said system including projector lens 4. The reflected light beam at mirror 8 is routed to birefringent prism 5. Prism 5 splits the incident beam into two orthogonal sub-beams.

The straight propagated beam through prism 5 is projected to tetrahedral rotary mirror 6. Then, the pinhole of slit 1 produces an image spot of 0.01 mm. in diameter on film frame 7 which is to be analyzed. The spot is moved on the frame along its x axis by rotational motion of mirror 8 and along its y axis by rotational motion of mirror 6 (see FIG. 2). Consequently, the frame is swept completely by the flying spot having 0.01 mm. in diameter.

The light beam at 90° to the said straight propagated beam through birefringent prism 5 (FIG. 1) makes an image spot of the pinhole of slit 1 of transmittance scale 9 using mirror 15. The image spot sweeps scale 9 along its x axis by rotational motion of mirror 8.

A light geam generated by light source 16 is passed through the pinhole of slit 2 (FIG. 2) and projected to octahedral mirror 8 by projector lens 10. The light beam reflected by mirror 8 makes an image spot having 0.01 mm. in diameter on the x axis scale 11 by passing it through a mirror arrangement 15. The spot is moved on scale 11 along its x axis only by rotational motion of mirror 8.

The beam of light passed through the pinhole of slit 3 is optically projected on the y axis scale 13 by projector lens 12 passing through tetrahedral rotary mirror 6. The image spot having 0.01 mm. in diameter is moved on scale 13 along its y axis by rotational motion of mirror 6. The octahedral mirror 8 is used for an x axis scanner and tetrahedral mirror 6 is used for a y axis scanner to rotate with a fixed speed respectively to maintain the synchronization between each motion.

In FIG. 2 all of the optical sources are not shown. The source for projecting the pinhole on the film frame is shown but the source for projecting spots to the respective scales 11 and 13 are not shown but can be arranged similarly to the arrangement of FIG. 1.

In FIG. 2, the x axis scale 11 and the y axis scale 13 (FIG. 1) have slits spaced in 0.02 mm. respectively. The light beams exited from the axis scale slits are received by photomultipliers 33 (FIG. 2) and then converted into a pulse signal having the same width to said axis scale slit.

Since a photomultiplier converts a light intensity into electric energy by the use of the photoelectric effect, photomultipliers 33 produce 1750 pulses for each x axis scan against a 35 mm. width frame and 1200 pulses for each y axis scan against a 24 mm. height frame through the slits of scales 11 and 13 respectively.

The resultant pulse signals are amplified, shaped and counted by the associated electronic circuitry. Counting values are recorded onto the magnetic tape through gate circuitry which is opened by a preset signal which is dependent on the light transmission of the frame. Consequently, the coordinates are read out in binary coded decimal form related to the predetermined transmittance level.

The counting in the x axis lasts until a 1750 pulse count is obtained for each scan. Then the counting is reset automatically and restarted from zero for the next scan.

In FIG. 2, the birefringent prism is shown at 5, mirrors at 15, and the focusing lens at 28, the pinhole slit at 18, projector lens at 19, amplifiers at 20, and-gates at 21, Schmidt triggers at 22, gate circuits at 23, logic circuits at 24, tape recorder at 25, computer at 26, differential amplifier at 27, condensers at 28 and 29, motor at 30, magnet clutch at 31, and converter at 32.

The light transmission measurement for the film is obtained as a digital quantity having 0.2 step range between the density index 0 to 2. Since the change in light transmission through the film varies with the light beam intensity through it, the light beam intensity is converted into an electrical signal by the photomultiplier. The analog-to-digital means associated with the photomultiplier reads out the electrical signal in digital quantity. The digital data contains the information on the change in light transmission through the film, and is recorded onto a magnetic tape with the digital data presenting the $x$ and $y$ coordinates.

To solve the problem in the synchronization between film threading, film scanning and coordinate counting, and to avoid miscounting, such as an unnecessary counting which could occur during the time between completion of the scanning of one film and initiation of the next film scanning caused by continuous rotation of the $x$ axis mirror and the $y$ axis mirror, the following provision is made by this invention:

The pinholes are provided at both ends of each axis scale besides the slits used for the coordinate counting. When the direction of the scanning is set, the beam of light passes through pinhole B on the scale 11 and pinhole C on the scale 13 simultaneously, because the scanning of film 7 (FIG. 1) starts at point E and ends at point F. Otherwise, only one pinhole on either axis scale passes the beam of light at the completion of the scanning. The And-signal obtained by both incident beams at pinhole B and C is used for the stop command signal for the coordinate counting. The counting is prohibited by this gate signal, even the counting signal is prevented. The And-signal is also used for the control of the film threading actuating the magnet clutch to make a coupling between the film drive motor and the film drive mechanism. When the film is placed on the analyzer window, a mechanical contact signal is generated to indicate that the frame to be processed is at rest position. Following this rest indicating signal, the scan start signal is generated when the light beams exited from both pinhole A and C are coincident. The sweep for the new frame is initiated by the scan start signal at point E. This signal opens the gate circuit and allows the counting.

As stated in the foregoing, a change in light transmission through the film is measured in forms of a digital quantity related to the intensity of the light source. This means the transmittance of the photographic film recorded data might be changed depending on the intensity of the light source. To correlate the obtained digital data with the true transmittance of the film automatically and precisely, the following method is utilized in the present invention.

(1) A standard electric quantity is provided by the photomultiplier measuring a known transmittance.

(2) The photomultiplier having the same characteristic as the above photomultiplier employed in the system measures the change in light transmission through the film. Then, the obtained data is compared to the standard electric quantity.

(3) The difference is applied to the analog-to-digital to provide the correlation.

The number of the processed films is obtained by adding each film threading signal.

As explained above, the present invention employs a new optical arrangement which presents more linear scanning and minimal scanning spots, and provides high quality data. The present device is useful for aerial photography, exposing camouflage, X-ray contours and various civil applications.

What is claimed is:

1. An automatic analyzer for photographic film recorded data processing including optical scanning means comprising a path for light from a given source of light for sweeping a film with a flying spot of light about 0.01 mm. in diameter along $x$ and $y$ coordinates, birefringent prism means in said path for directing light therefrom along a second path, a standard density scale in the second path for passing light therethrough, light responsive means receiving the light passing through the film to convert it to an electrical signal, further light responsive means having characteristics similar to the first mentioned light responsive means receiving the light passing through the standard density scale to convert it to a further electrical signal, differential amplifier means connected to receive said signals and provide a difference output signal, means for converting the difference output signal to a digital signal, means for recording the digital signal as an indication of scanned density of the film, separate measuring scale means for said $x$ and $y$ coordinates, means for directing a further light beam to said optical scanning means for $x$ coordinate scanning, the $x$ measuring scale means receiving the further light beam and transmitting pulsed light, $x$ light sensitive means receiving the pulsed light and converting it to electrical counting signals, synchronizing means for applying the counting signals to the means for recording the digital signals in synchronization therewith, means for directing another light beam to said optical scanning means for $y$ coordinate scanning, the $y$ measuring scale means receiving said another light beam and transmitting $y$ pulsed light, $y$ light sensitive means receiving the $y$ pulsed light and converting it to $y$ electrical counting signals, and $y$ synchronizing means for applying the $y$ counting signals to the means for recovering the digital signals in synchronization therewith.

2. In an automatic analyzer for photographic film recorded data, means for moving a film, frame by frame, optical scanning means including an octahedral mirror, a tetrahedral mirror, said mirrors being rotatable about axes pependicular to one another, a birefringent prism means between said mirrors, a source of light and associated pinhole slit means for projecting a light spot of about 0.01 mm. in diameter on said film via said mirrors and birefringent prism means, said spot being responsive to rotation of said first two mentioned mirrors to sweep the film along $x$ and $y$ axes, predetermined density light transmittance scale means for receiving an orthoganol light beam from said birefringent prism means of the same diameter as said spot, photomultiplier means responsive to light passing through the transmittance scale means to develop an electrical signal, further photomultiplier means responsive to light passing from said spot through said film to develop a scanning spot electrical signal, means comparing said signals as to magnitude to determine the difference therebetween as a difference electrical signal, means responsive to the difference signal to convert it to a binary signal, means for recording the binary signal, an $x$ axis measuring scale means, a $y$ axis measuring scale means, means for projecting a $y$ axis beam via said rotating tetrahedral mirror to said $y$ axis scale means, means for projecting an $x$ axis beam of light via said octahedral mirror to said $x$ axis measuring scale means, said $x$ and $y$ scale means characterized by slits to pass light pulses, $x$ and $y$ photomultiplier means to receive respectively the $x$ and $y$ light pulses and convert the same to $x$ and $y$ electrical pulses for recordation by the means for recording the binary signal, and $x$ and $y$ frame signal developing means responsive to predetermined amounts of scanning of the $x$ and $y$ scale means to interrupt said recordation at the end of each frame.

References Cited

UNITED STATES PATENTS

| | | | |
|---|---|---|---|
| 2,157,468 | 5/1939 | Walton | 178—7.6 |
| 2,818,467 | 12/1957 | Harris et al. | 250—219 |
| 2,881,416 | 4/1959 | Hosken | 250—219 |

ARCHIE R. BORCHELT, Primary Examiner

M. ABRAMSON, Assistant Examiner

U.S. Cl. X.R.

178—7.6; 250—236; 356—203